June 23, 1931.  A. L. KUHLMAN  1,811,087
CALIPER RULE
Filed March 19, 1928
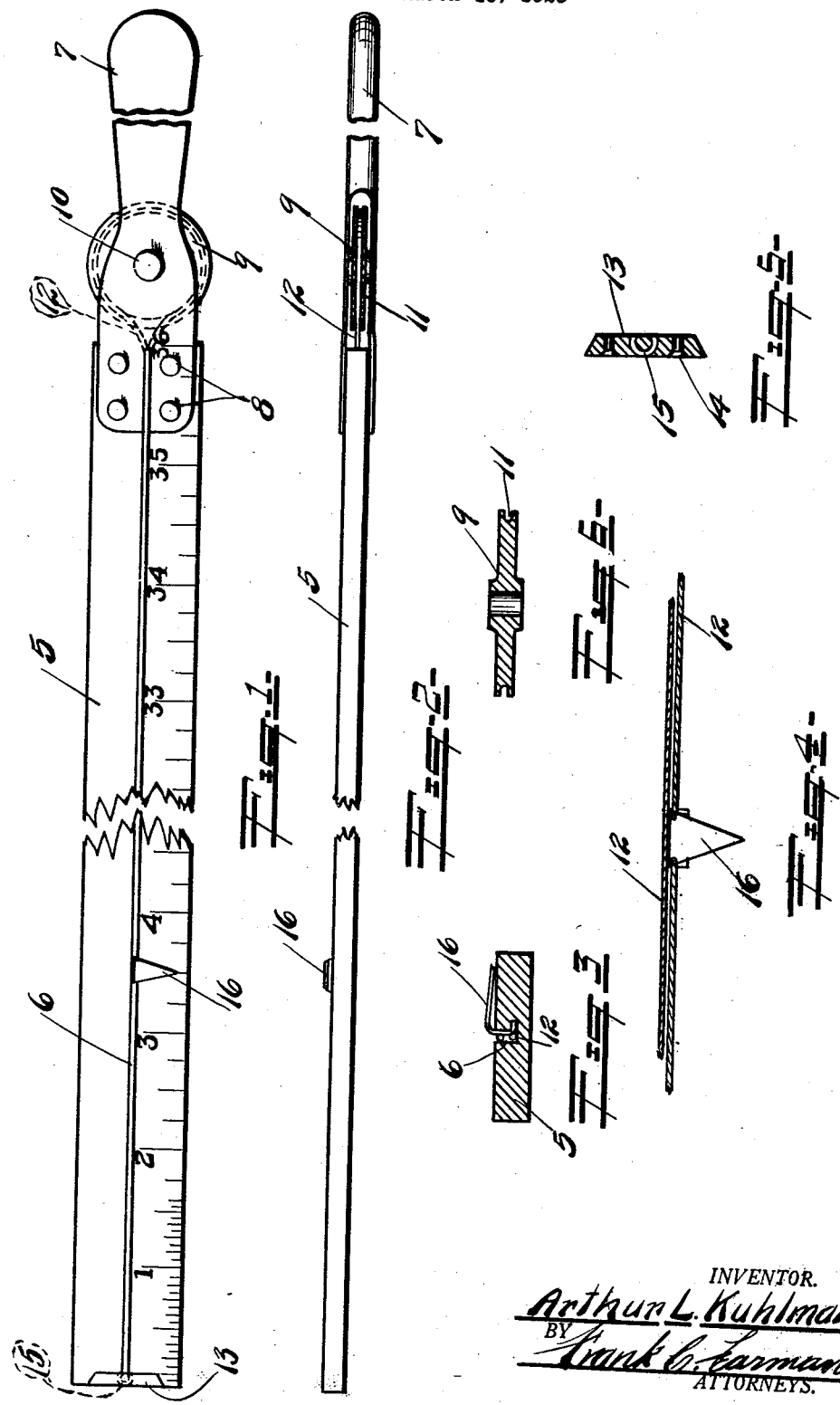
INVENTOR.
Arthur L. Kuhlman.
BY Frank C. Carman.
ATTORNEYS.

Patented June 23, 1931

1,811,087

UNITED STATES PATENT OFFICE

ARTHUR L. KUHLMAN, OF BAY CITY, MICHIGAN

CALIPER RULE

Application filed March 19, 1928. Serial No. 262,642.

This invention relates to rules, and particularly to a caliper rule for setting off measurements by means of an indicator slidably mounted in the rule.

The prime object of the invention is to provide a rule provided with an indicating member movably mounted thereon, and provide means such as a "remote control" whereby the said member may be selectively moved in either direction, and which will remain in set position.

A further object is to design a rule of neat and pleasing appearance, particularly adapted for decorators, scalers and others, where measurements must ofttimes be taken by reaching at arm's length, making necessary climbing on ladders, chairs, etc.

A further object still is to provide simple and substantial means for adjusting the indicator, and which is operable by the one hand which holds the rule.

The above and other objects will appear as the specification progresses, reference being had to the accompanying drawings in which I have shown the preferred embodiment of my invention, and in which like reference numerals indicate like parts throughout the several views thereof.

In the drawing.

Fig. 1 is a top plan view showing my improved rule.

Fig. 2 is an edge view thereof.

Fig. 3 is an enlarged transverse sectional view.

Fig. 4 is a fragmentary plan showing the indicator and cords.

Fig. 5 is a sectional plan of the end number, and

Fig. 6 is a sectional edge view of the grooved thumb wheel.

Referring now to the drawings, the numeral 5 indicates the body of the rule which can be formed of wood or any other material, a longitudinally disposed groove 6 is provided in said rule, and a handle member 7 is connected to the one end by means of bolts or rivets 8, said handle being preferably in the form of a stamping, the one end being forked and is adapted to accommodate a thumb wheel 9, which is rotatably mounted on a shaft 10, said wheel being grooved as shown at 11 to accommodate a cord 12 which is trained thereover, the edges of said thumb wheel being scored to facilitate the turning thereof.

An end member 13 is secured to the opposite end of the rule by means of screws 14, and this can be in the form of a stamping, or it can be made of bone or any other suitable substance, a circular groove 15 being formed therein and is adapted to accommodate the cord 12.

The groove 6 is preferably L-shaped and is adapted to accommodate an indicator member 16 which can be of any suitable design, in the present instance this is shaped to freely travel in the groove, and the ends of the cord are anchored thereto in any approved manner, one end of the cord being anchored to the one side of the indicator 16 thence being threaded through and around the groove 15, thence leading to and around the grooved wheel 9, and returning and being anchored to the opposite side of the indicator, thereby forming a continuous circuit.

In practice the handle of the rule is grasped in one hand, the rule is then placed on the object or part to be measured, the thumb wheel is then rotated (by the thumb) to bring the indicator to the proper measurement, the indicator shows this measurement which can be readily read and remains in set position until such time as the thumb wheel is again manipulated.

It will of course be obvious that the cord may have an additional loop around the thumb wheel, to prevent any slippage, and that the wheel may be placed on the side of rule proper, and thereby eliminate the handle. I find however, that the design as shown is more desirable due to ease of manipulation with but one hand.

This provides a very convenient, neat and economical rule which can be readily manipulated and easily and cheaply manufactured and assembled.

What I claim is:—

1. A grooved rule having a handle on the one end thereof, a sheave journaled in said handle and having its edges projecting beyond the edges of said handle, flexible means adapted to travel in said groove, and means on the opposite end of said rule through which the flexible means is threaded, said flexible means being trained over said sheave and forming a continuous circuit.

2. A grooved rule having a handle on one end thereof, a sheave journaled in said handle and having its edges projecting beyond the edges of the handle for manipulation by the operator's thumb, flexible means trained over said sheave and adapted to travel in said groove, an indicator mounted thereon, and means on the opposite end of the rule and through which the flexible means is threaded to form a continuous circuit.

In testimony whereof I hereunto affix my signature.

ARTHUR L. KUHLMAN.